United States Patent
Choi et al.

(10) Patent No.: US 10,421,422 B2
(45) Date of Patent: Sep. 24, 2019

(54) SOUND TUNING BASED ON ADJUSTABLE SEAT POSITIONING

(71) Applicant: Harman International Industries, Incorporated, Stamford, CT (US)

(72) Inventors: Jason Choi, Ferndale, MI (US); Bradford Hamme, Farmington, MI (US); Chris Ludwig, Birmingham, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/698,946

(22) Filed: Sep. 8, 2017

(65) Prior Publication Data

US 2019/0077345 A1    Mar. 14, 2019

(51) Int. Cl.
| | |
|---|---|
| G06F 3/16 | (2006.01) |
| B60R 16/037 | (2006.01) |
| H04S 7/00 | (2006.01) |
| B60N 2/00 | (2006.01) |

(52) U.S. Cl.
CPC ............ B60R 16/037 (2013.01); G06F 3/165 (2013.01); H04S 7/302 (2013.01); *B60N 2/002* (2013.01); *H04R 2499/13* (2013.01)

(58) Field of Classification Search
CPC ...... H04R 5/023; H04R 2449/13; B60N 2/00; B60N 2/806; B60N 2/885; B60N 2/0244; B60N 2/879; B60N 2/4882; B60N 2/4876
USPC ..... 700/94; 381/93, 27, 17–18, 86, 71.4, 59, 381/333, 301, 361, 345, 388; 701/49, 701/306, 314, 36, 48
See application file for complete search history.

(56) References Cited

U.S. PATENT DOCUMENTS

| | | | | |
|---|---|---|---|---|
| 4,042,791 | A * | 8/1977 | Wiseman | H04R 5/023 |
| | | | | 381/109 |
| 6,744,898 | B1 * | 6/2004 | Hirano | H04R 5/023 |
| | | | | 381/333 |
| 2001/0038698 | A1 * | 11/2001 | Breed | B60J 10/00 |
| | | | | 381/86 |
| 2006/0158715 | A1 * | 7/2006 | Furusawa | B60J 3/04 |
| | | | | 359/265 |
| 2008/0037803 | A1 | 2/2008 | Breed | |
| 2011/0295454 | A1 * | 12/2011 | Meyers | B62J 17/00 |
| | | | | 701/22 |
| 2013/0314536 | A1 * | 11/2013 | Frank | H04N 5/33 |
| | | | | 348/148 |
| 2014/0054880 | A1 * | 2/2014 | Feinstein | B60R 21/203 |
| | | | | 280/731 |

(Continued)

FOREIGN PATENT DOCUMENTS

JP    2007054098    3/2007

*Primary Examiner* — Melur Ramakrishnaiah
(74) *Attorney, Agent, or Firm* — Angela M. Brunetti

(57) ABSTRACT

A system and method for tuning an audio system based on a seat position. The system senses and measures any change in seat position from a default seat position and adjusts a set of modified tuning parameters to be applied to the audio system based on the modified seat position. The modified tuning parameters may be mapped to a set of tuning parameters depending on the sensed and measured seat position. Alternatively, the modified tuning parameters may be set somewhere between a minimum set of tuning parameters and a maximum set of tuning parameters based on the sensed and measured seat position.

31 Claims, 6 Drawing Sheets

(56) References Cited

U.S. PATENT DOCUMENTS

2014/0241534 A1\* 8/2014 Zielinski ............... H03G 5/005
  381/57
2015/0350758 A1 12/2015 Zhao et al.
2016/0142852 A1\* 5/2016 Christoph .............. H04S 7/303
  381/302
2017/0134837 A1\* 5/2017 Rosen .................... H04R 5/023

\* cited by examiner

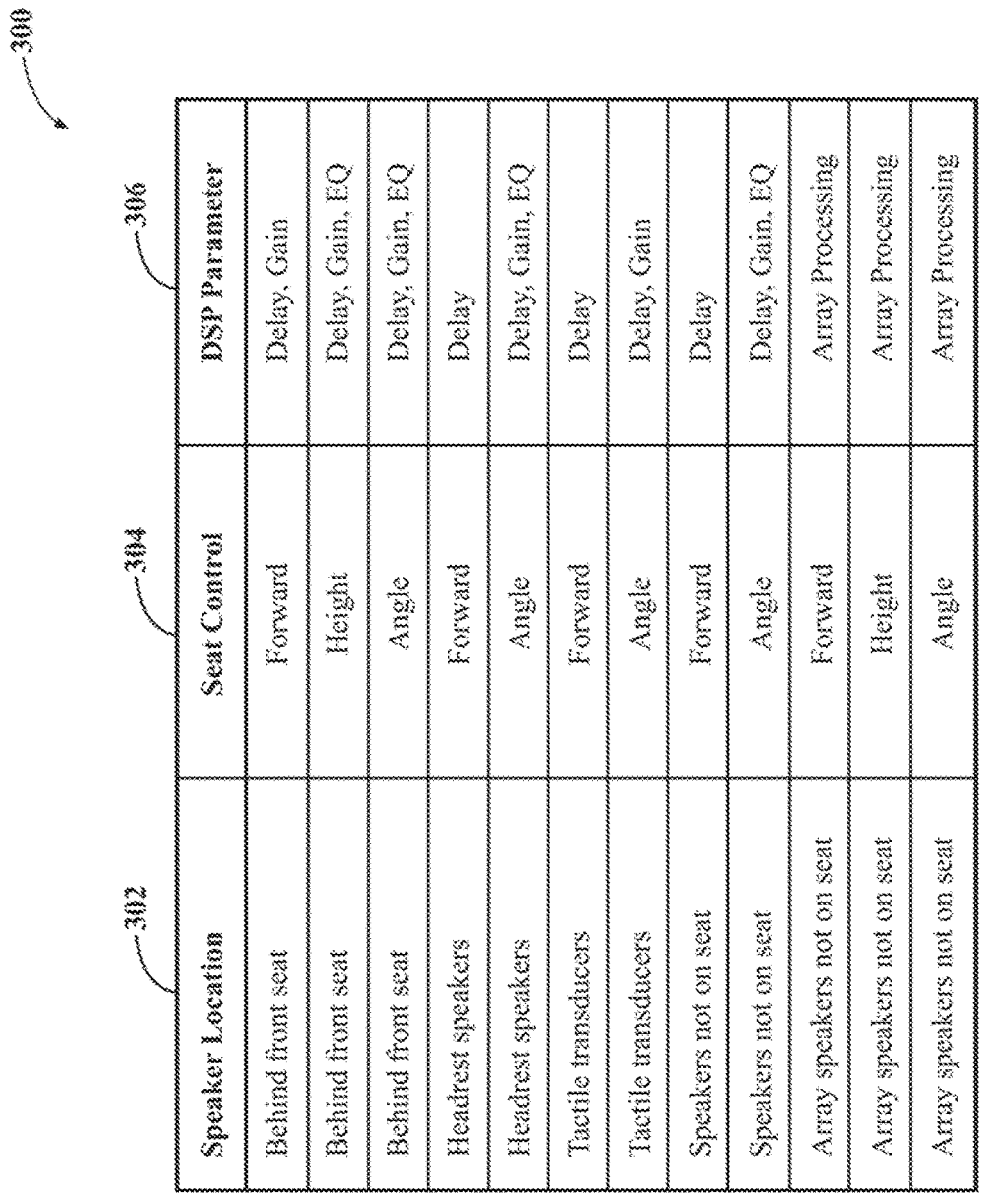

FIG. 3

| Speaker Location | Seat Control | DSP Parameter |
|---|---|---|
| Behind front seat | Forward | Delay, Gain |
| Behind front seat | Height | Delay, Gain, EQ |
| Behind front seat | Angle | Delay, Gain, EQ |
| Headrest speakers | Forward | Delay |
| Headrest speakers | Angle | Delay, Gain, EQ |
| Tactile transducers | Forward | Delay |
| Tactile transducers | Angle | Delay, Gain |
| Speakers not on seat | Forward | Delay |
| Speakers not on seat | Angle | Delay, Gain, EQ |
| Array speakers not on seat | Forward | Array Processing |
| Array speakers not on seat | Height | Array Processing |
| Array speakers not on seat | Angle | Array Processing |

SOUND TUNING BASED ON ADJUSTABLE SEAT POSITIONING

TECHNICAL FIELD

The inventive subject matter is directed to an audio processing system and more particularly to processing audio in a speaker system installed in a vehicle.

BACKGROUND

Sound tuning is applied to audio systems to optimize sound quality in a listening environment such as a room or an interior of a vehicle. Speaker placement and relative dimensions of positions for seats in a listening environment, the seats being set among speakers, may affect sound tuning settings. When an audio system is set up and sound tuning is applied for particular seat positions there are many situations for which relative dimensions of positions among speakers may change, thereby affecting the sound tuning.

For example, installing speakers on a backside of a vehicle seat, directed at rear passengers in a vehicle, is useful for center imaging. Center imaging is an audio effect, achieved through panning, that creates the illusion of a center speaker even when a center speaker is not physically present. However, a position of a vehicle seat within a vehicle may be altered. The vehicle seat may be adjusted horizontally (forward or backward), vertically (up or down), and/or tilted. Some adjustments to vehicle seat position that accommodate a driver or front passenger may alter the tuning of a speaker or speaker array that is located on the backside of the vehicle seat. For example, when the seat is adjusted forward or backward, a time delay of one or more speakers with respect to other speakers in the sound system is altered, which may affect sonic character due to phase relationships. Also, when a seat height is adjusted, or an incline angle is adjusted, the speaker or speaker array may propagate at a different angle. The frequency response of the speaker and the tuning may no longer be viable or optimized with respect to an original tuning location for the speaker or speaker array.

There is a need for an audio processing system and method that adjusts parameters associated with an audio processor for a speaker system in response to a change in position of a seat to maintain optimal frequency response and tuning for the speaker system.

SUMMARY

A system and method for tuning an audio system based on a seat position. The system senses and measures any change in seat position from a default seat position and adjusts a set of modified tuning parameters to be applied to the audio system based on the modified seat position. The modified tuning parameters may be mapped to a set of tuning parameters depending on the sensed and measured seat position. Alternatively, the modified tuning parameters may be set somewhere between a minimum set of tuning parameters and a maximum set of tuning parameters based on the sensed and measured seat position.

DESCRIPTION OF DRAWINGS

FIG. 3 is a table depicting example digital signal processing (DSP) parameters within a vehicle affected by seat position;

Elements and steps in the figures are illustrated tor simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter. All references to circuits or other electrical devices and the functionality provided by each are not intended to be limited to only what is illustrated and described herein. Such circuits and other electrical devices may be combined with or separated based on implementation. Further, controllers, processors, integrated circuits, memory devices, may be configured to execute program that is embodied in a non-transitory computer readable medium that may be programmed to perform any number of functions.

Figure 1:
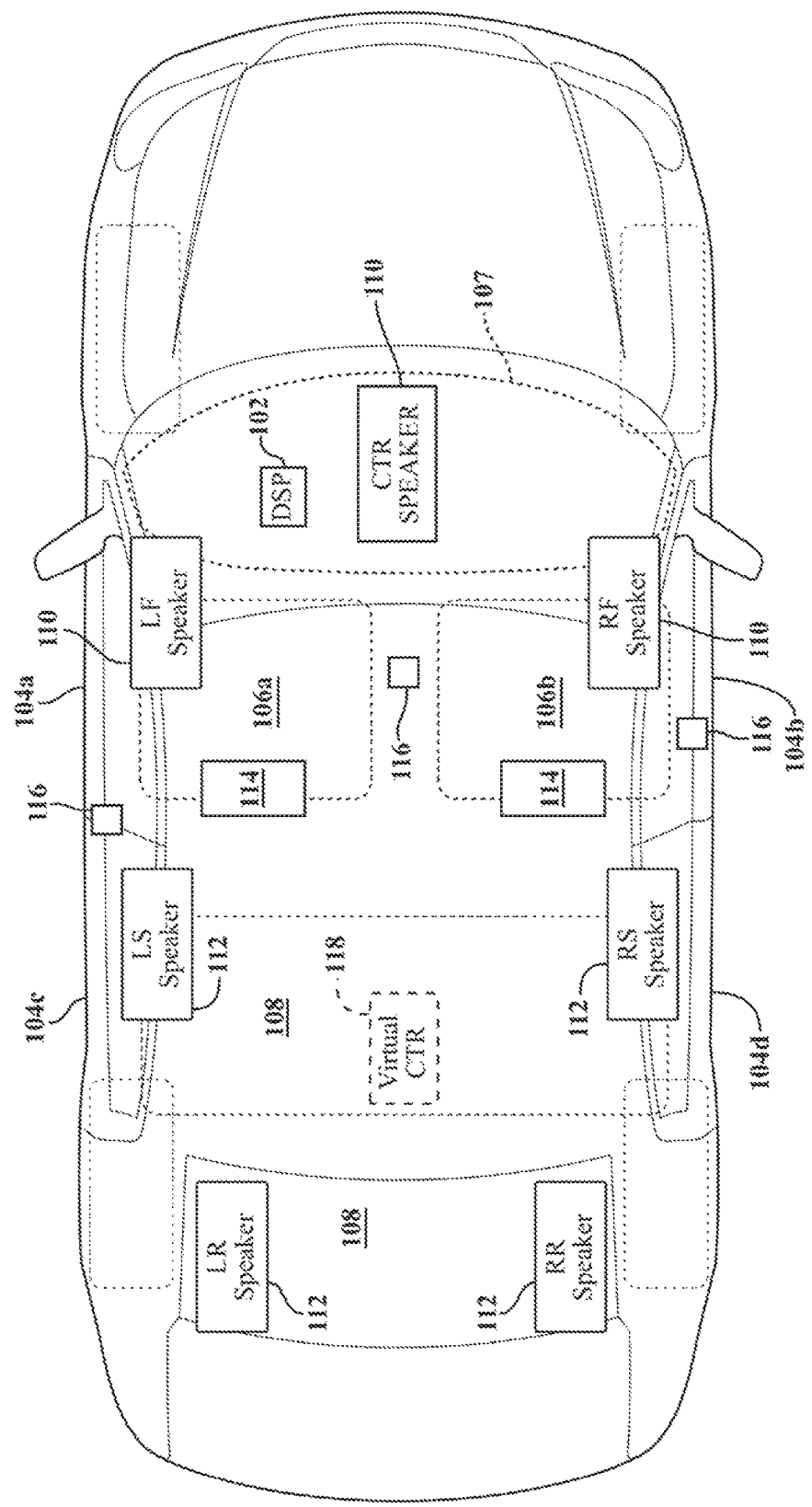
FIG. 1 is a block diagram of a vehicle including a sound processing system.

FIG. 1 is a block diagram of a vehicle 100 having an audio system, also called a digital signal processing system (DSP) 102 that may include any or a combination of sound processing systems and methods described herein. While a vehicle environment is being used as an example to describe one or more embodiments, it should be noted that the inventive subject matter is applicable to many other environments. For example, a room environment, a home theatre environment, a commercial theatre or arena environment, to name a few. One skilled in the art is capable of applying the system to a multitude of environments. The vehicle 100 includes doors 104a-d, front seats 106a, 106b and a rear seat 108. The vehicle may have more or fewer doors. The vehicle may be a car, truck, boat, motorcycle. The particular seat configuration may also have more seats, such as third-row seating. The DSP 102 supports the use of various sources for audio, such as a radio, CD player, DVD player, mobile devices and the like which are not shown in FIG. 1. The audio processing system 102 improves the reproduction of sound by controlling the amplitude phase and mixing ratios between discrete and passive decoder surround signals that are projected through loudspeakers, also called speakers. Typically, the vehicle has one or more front speakers 110 and one or more rear speakers 112. The vehicle may have rear-facing speakers 114. The rear-facing speakers may be positioned in the front seats 106*a*, *b*, to face passengers in the rear seat 108. Most audio systems also include one or more microphones 116 mounted throughout the vehicle interior.

The DSP 102 improves the reproduction of a sound field by controlling the amplitude, phase, and mixing ratios of output signals by applying a set of tuning parameters to the audio system. The spatial sound field reproduction is improved for all seating locations by re-orientation of the direct, passive and active mixing and steering parameters in the vehicle environment. The mixing and steering ratios may be adaptively modified as a function of noise and other environmental factors. Information from vehicle sensors, microphones or other transducers may be used to control the mixing and steering parameters. Additionally, in FIG. 1, creating the of a center speaker, or a virtual speaker 118, that may be synthesized through manipulation of the audio system 102, as known in surround sound systems currently available in vehicles is being used as an example of one or more embodiments of the inventive subject matter.

Tuning a vehicle audio system, such as to create the illusion of the center speaker 118, may be achieved without modification for a system in which speaker positions are all relatively fixed, such as having a set of default tuning parameter settings that are associated with a default seat position. However, a position of a vehicle seat may be altered. Vehicle seats may be adjusted forward, backward, up, down as well as tilted. When the seat is adjusted forward or backward, a time delay of one or more speakers with respect to other speakers in the sound system is altered, which may affect sonic character due to phase relationships. Also, when a seat height is adjusted, or an incline angle is adjusted, the speaker or speaker array in the seat may propagate at a different angle. The frequency response of the speaker and the tuning may no longer be viable or optimized with respect to an original tuning location for the speaker or speaker array.

Figure 2A:
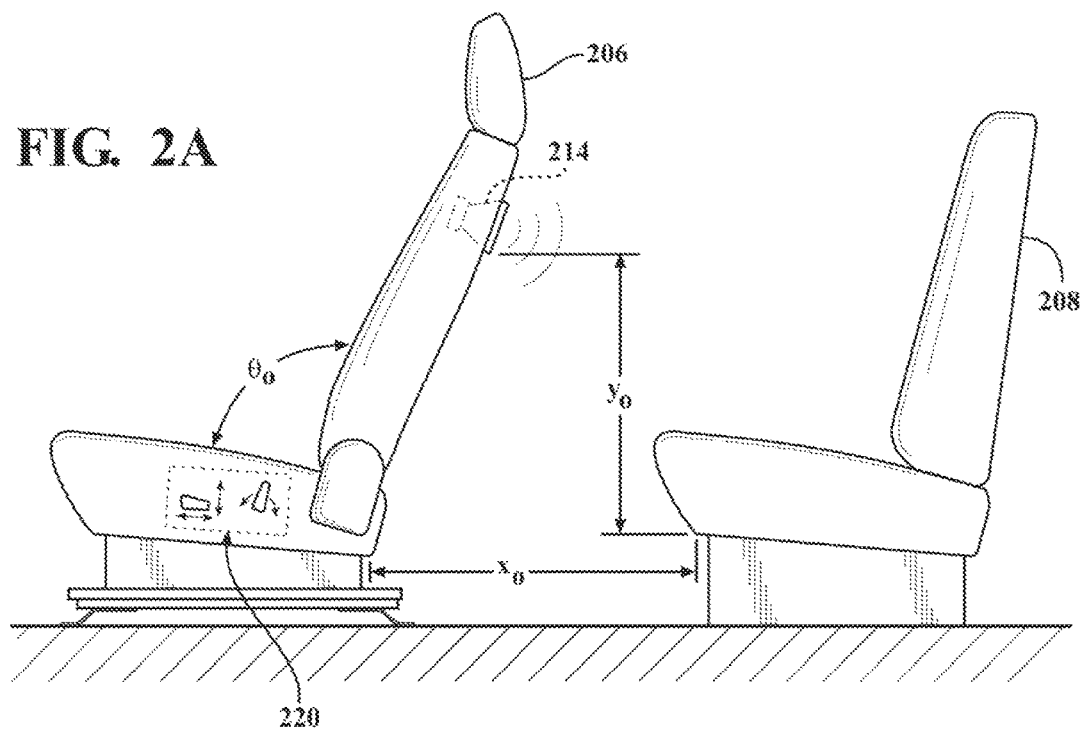
FIG. 2A is an example of an initial position of a vehicle seat having a speaker system installed on a backside of a vehicle seat that is capable of adjustments to horizontal, vertical and incline angle positions.
Figure 2B:
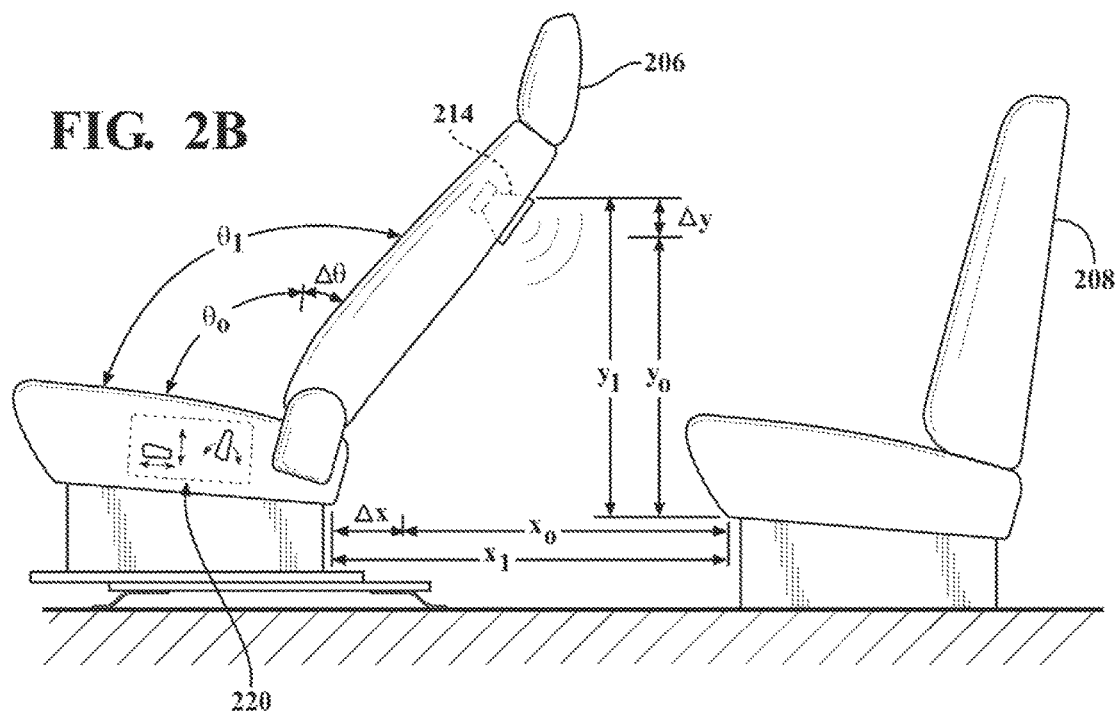
FIG. 2B is an example of the vehicle seat adjusted from the initial position.

FIGS. 2A and 2B are examples of a front vehicle seat 206 that is equipped with a speaker, or speaker array, 214 that faces a rear vehicle seat 208. The front vehicle seat 206 is also equipped with a mechanism 220, power or manual, to adjust the position of seat 206 in any one or more directions, such as horizontally, x, vertically, y, and an incline angle θ. The front vehicle seat 206 in FIG. 2*a* is shown in an initial position, $x_0$, $y_0$ and $\theta_0$ with respect to the rear seat 208. The front vehicle seat 206 in FIG. 2*b* is shown in a modified position $x_1$, $y_1$, and $\theta_1$. The modified position is a change in any one or more of the horizontal, vertical and incline angle positions from the initial position.

Modification to the seat position may also affect a set of tuning parameter settings with speaker locations other than rear-facing speakers in the seat, FIG. 3 is a table 300 that outlines the relationship among the speaker type and location 302, a seat control position 304 and the DSP parameters affected 306 for a vehicle environment. In addition to a speaker or a speaker array in a front seat where the speaker or speaker array is facing rear passengers, headrest speakers, tactile transducers (such as a bass shaker), speakers (singular and array) that are not located on the front seat may also have a set of tuning parameter settings affected by a modification to the position of a seat. The set of tuning parameter settings that are dependent upon a seat position may include gain, delay, equalization, array processing and any other miscellaneous audio algorithms that may be associated with the audio system. It should be noted that a vehicle environment is presented herein for example purposes only and that the inventive subject matter is applicable to other environments that include an audio system.

Figure 4:
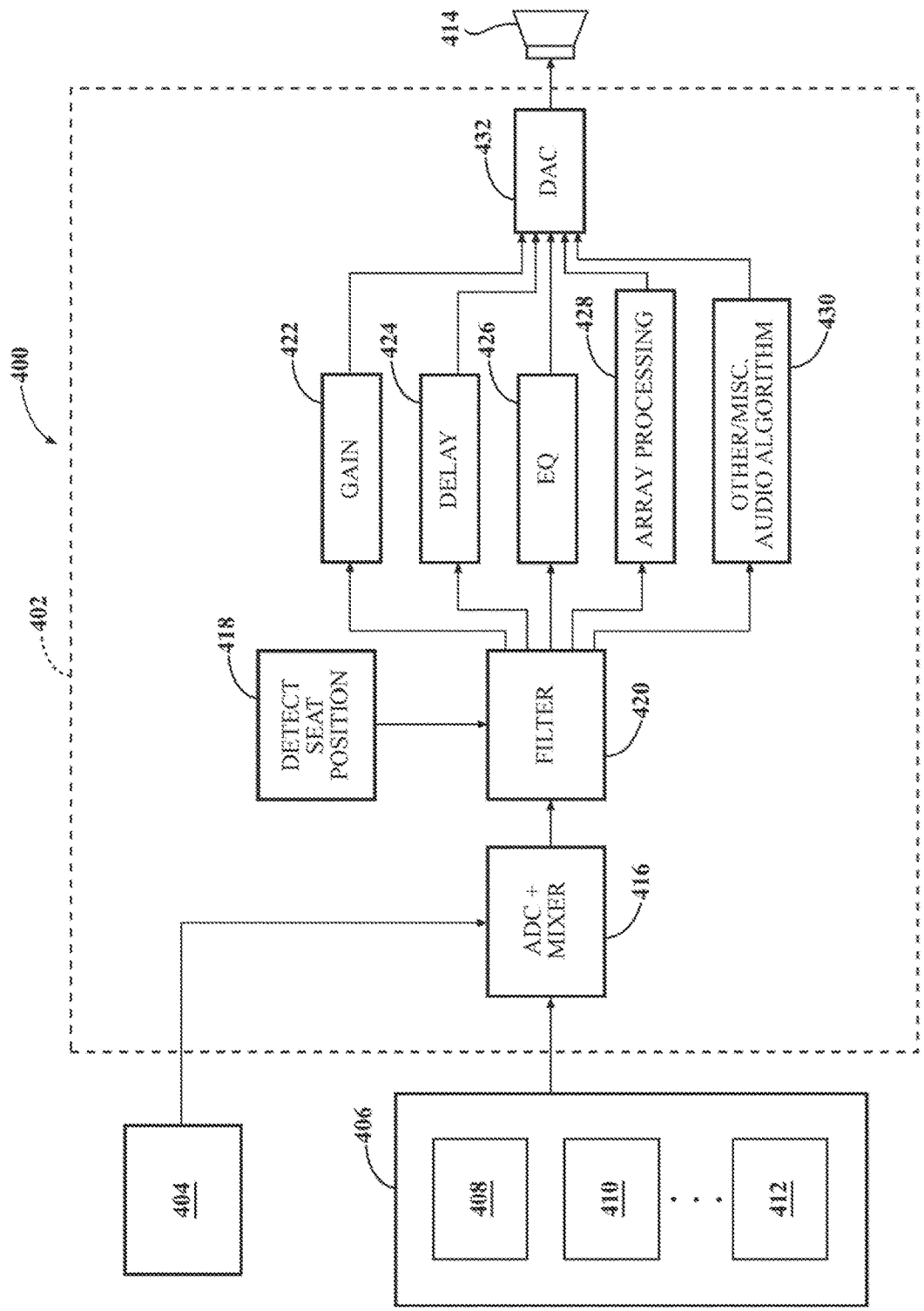
FIG. 4 is a block diagram of a DSP system based on a detected seat position.

FIG. 4 is block diagram of a DSP system 400 that accounts for a detected seat position. A sound processor 402 receives inputs from sources associated with audio, such as a bead unit 404 which typically encompasses a radio tuner, CD player, DVD player, etc., and any secondary sources 406 such as a navigation unit 408, a mobile device 410 or other source 412 that may be connected wirelessly or through a wired connection to the sound processor 402. The output is directed to any speaker 414 that is affected by the change in seat position. Signals received at the sound processor 402 from sources 404-412 are converted to digital signals and mixed using an analog to digital converter and mixer 416. A signal 418 representative of a sensed and measured seat position and a filter 420 is applied that maps the detected seat position to any of the sets of parameter settings that may be affected by the change in seat position. Signal processing determines a set of modified tuning parameter settings that applies adjustments to any one or more of a gain 422, delay 424, equalization 426, array processing 428 and other audio algorithms 430 in the sound processor 402. The signals are converted back to analog signals using a digital to analog converter 432 and output to any speaker 414 affected by the modified seat position.

Seat position detection and measurements may be accomplished through a dedicated sensor installed in the vehicle that detects the seat position. Additionally, or alternatively, seat position may be detected and measured using a camera-based system that senses and measures depth, a LIDAR or other optical sensor that provides a light-based distance measurement, or a sound-based distance measurement such as SONAR.

A delimit seat position has a predefined delay, gain and EQ associated with it so that the audio system is optimally tuned to the default seat position using a set of default tuning parameter settings. When a seat position is modified so that any one of the horizontal, vertical and angle positions are changed, the parameter settings to maintain optimal tuning will be modified. When the front seat is moved, either increasing or reducing the horizontal distance between the front and rear seats, the delay and gain are affected and the system must be re-tuned. Similarly, when the vehicle height is adjusted, either increasing or reducing the height, or vertical distance, of the speaker on the front seat, the delay and gain are affected. And when an angle position of the seat is modified, either increasing or decreasing the tilt of the seat, the delay, gain and EQ are all affected, introducing the need to modify all three parameters to maintain optimal tuning.

Seat position to sets of tuning parameter settings may be mapped to determine adjustments that may need to be made to the parameter settings dependent upon the seat position. For example, interpolating between minimum and maximum values, interpolating between minimum and maximum values and a default midpoint setting. Alternatively, because the vehicle seat position is known to have a finite number of possible positions, it is possible to map an absolute seat position to a predetermined set of tuning parameter settings. The predetermined set of tuning parameter settings for each of the seat positions in the finite number of seat positions may be stored in a look up table or accessed in a database. Each set of tuning parameter settings may be mapped to a specific seat position. Therefore, when a modified seat position is sensed and measured, the corresponding set of tuning parameter settings associated with the modified seat position may be selected from the lookup table or database and applied to the DSP.

Figure 5:
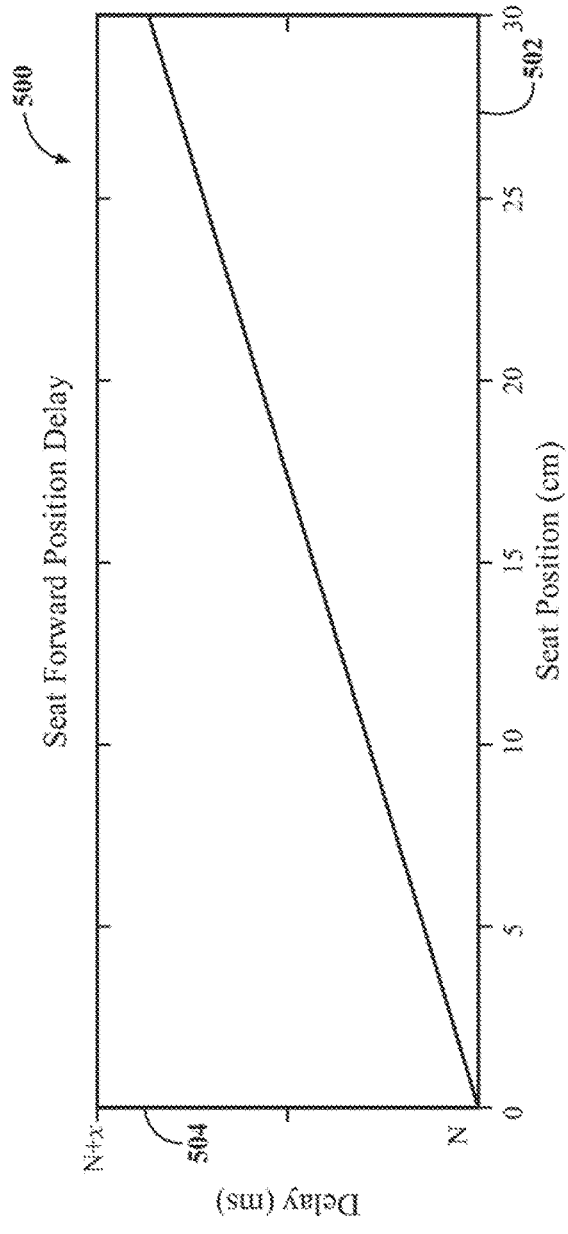
FIG. 5 is a graph depicting a DSP delay parameter based on seat position.
Figure 6:
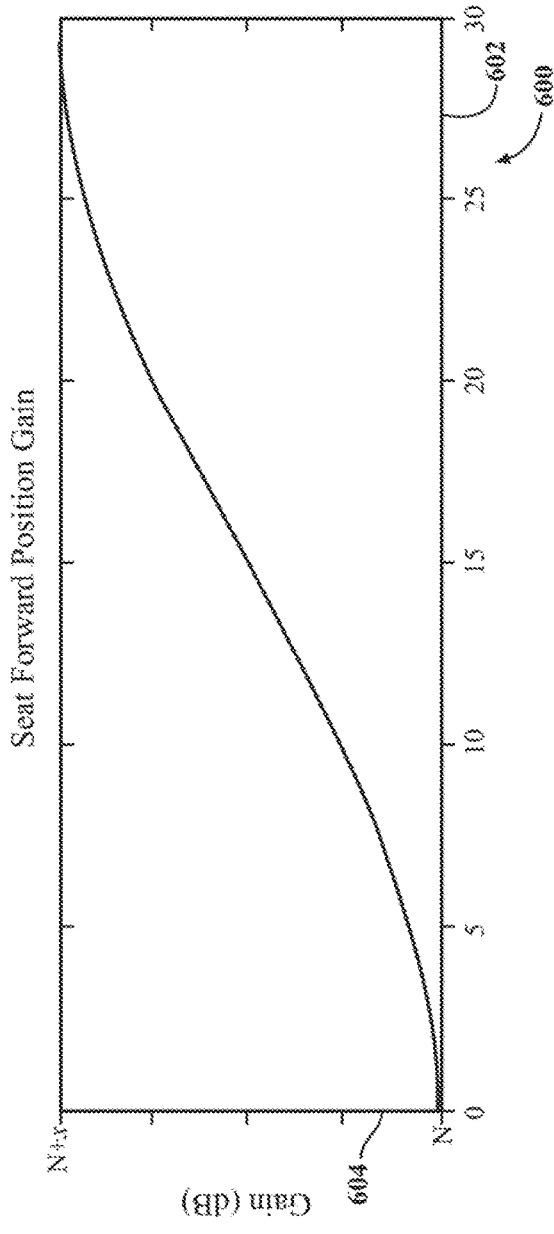
FIG. 6 is a graph depicting a DSP gain parameter based on seat position.

FIG. 5 is a graph 500 that depicts the relationship between a seat position 502 and delay 504 associated with the audio system which is a linear relationship. FIG. 6 is a graph that depicts the relationship between a seat position 602 and a gain 604 associated with the volume of the audio system.

Figure 7:
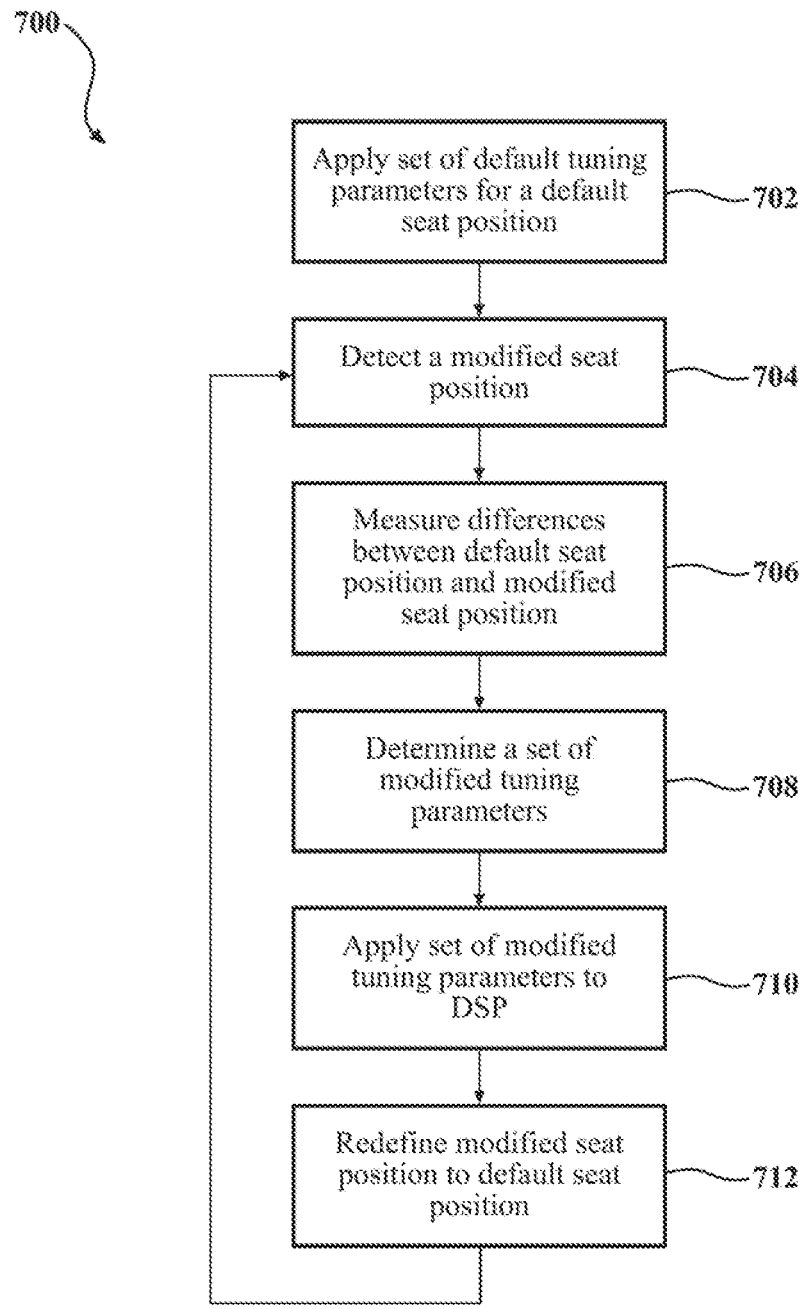
FIG. 7 is a flow chart of a method for DSP based on a detected seat position.

FIG. 7 is a flow chart of a method 700 for tuning an audio processor using a seat position. Initially an audio system is optimally tuned relative to a default seat position and a set of default tuning parameter settings is applied 702 to the DSP based on the default seat position. When modified seat position is detected 704, differences in any horizontal, vertical and/or angular direction from the default seat position are sensed and measured 706. A set of modified tuning parameter settings for the audio system are determined 708 as needed to accommodate the new seat position and maintain optimal tuning. Optimal tuning would be maintaining any newly tuned parameters as close as possible to the optimal tuning associated with the default seat position. The set of modified tuning parameter settings are applied 710 to the DSP. The new seat position may be redefined 712 as the default seat position, until the point in time that a modified seat position is detected 704, and the method repeats.

The description herein is of a system, a method, and or a computer program product. The computer program product may include a computer readable storage medium having computer readable program instructions for causing a processor to carry out steps and elements of the inventive subject matter. The computer readable storage medium may be, but is not limited to, an electronic storage device, a magnetic storage device, an optical storage device, an electromagnetic storage device, a semi-conductor storage device, or any suitable combination thereof.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A system for tuning an audio system based on a seat position, the system comprising the steps of:
   a default seat position;
   a set of default tuning parameter settings for the audio system based on the default seat position;
   a sensor for sensing a modified seat position and providing an output signal representative of a measurement associated with the modified seat position for the seat, the modified seat position is different from the default seat position;
   a digital signal processing system for receiving the output signal representative of the modified seat position; and
   a set of modified tuning parameter settings, determined by the digital signal processing system in accordance with the modified seat position that is applied to the audio system to adjust a tuning of the audio system based on the measurement associated with modified seat position.

2. The system as claimed in claim 1 wherein the sensor further comprises a seat position sensor.

3. The system as claimed in claim 2 wherein the seat position sensor is a camera.

4. The system as claimed in claim 2 wherein the sensor is an optical sensor.

5. The system as claimed in claim 4 wherein the optical sensor is a light-based distance sensor.

6. The system as claimed in claim 2 wherein the sensor is a sound-based distance sensor.

7. The system as claimed in claim 1 wherein the at least one loudspeaker is mounted to a backside of a vehicle seat.

8. The system as claimed in claim 7 wherein the at least one loudspeaker is mounted to the backside of a headrest of a vehicle seat.

9. The system as claimed in claim in claim 1 wherein the at least one loudspeaker is a tactile transducer.

10. The system as claimed in claim 1 wherein the set of default tuning parameters and the set of modified tuning parameters comprises one or more of a gain, a delay, an equalization, an array processing or other audio algorithm associated with the audio system.

11. The system as claimed in claim 10 further comprising:
    a set of minimum tuning parameters;
    a set of maximum tuning parameters; and
    wherein the set of modified tuning parameters is interpolated between the minimum and the maximum based on the modified seat position.

12. The system as claimed in claim 10 further comprising:
    a set of minimum tuning parameters;
    a set of maximum tuning parameters;
    a set of midpoint tuning parameters, between the set of minimum tuning parameters and the set of maximum tuning parameters, the set of midpoint tuning parameters defines the set of default tuning parameters; and wherein the set of modified tuning parameters is within the minimum and maximum and interpolated from the set of default tuning parameters.

13. The system as claimed in claim 10 further comprising:
a plurality of predefined seat positions having a set of tuning parameters associated therewith; and
the modified seat position is mapped to one of the plurality of predefined seat positions.

14. A method for tuning an audio system based on a modified seat position, the method comprising the steps of:
applying a set of default tuning parameters to an audio system in a vehicle, the set of default tuning parameters applies to a default seat position;
sensing and measuring a modified seat position that is different from the default seat position;
adjusting the set of default tuning parameters to a set of modified tuning parameters for the measured modified seat position; and
applying the set of modified tuning parameters to the audio system.

15. The method as claimed in claim 14 wherein the step of sensing and measuring a modified seat position further comprises camera-based depth measurement.

16. The method as claimed in claim 14 wherein the step of sensing and measuring a modified seat position further comprises optical-based distance measurement.

17. The method as claimed in claim 14 wherein the step of sensing and measuring a modified seat position further comprises sound-based distance measurement.

18. The method as claimed in claim 14 wherein the step of adjusting the set of default tuning parameters to a set of modified tuning parameters further comprises interpolating between minimum and maximum values for tuning parameters in the set of tuning parameters.

19. The method as claimed in claim 14 wherein the step of adjusting the set of default tuning parameters to a set of modified tuning parameters further comprises the set of default tuning parameters being at a midpoint between a minimum set of tuning parameters and a maximum set of tuning parameters and the set of modified tuning parameters is determined by interpolating among minimum, maximum and midpoint sets of tuning parameters.

20. The method as claimed in claim 14 further comprising a plurality of predefined seat positions having a set of tuning parameters associated therewith, and the method further comprising the step of mapping the set of tuning parameters to one of the plurality of predefined seat positions depending on the sensed and measured seat position.

21. A non-transitory computer readable medium comprising a program, which, when executed by one or more processors, performs an operation for tuning an audio system based on a modified seat position, the program comprising:

receiving a sensed and measured modified seat position, the modified seat position is a seat position that differs from a default seat position having a set of default tuning parameters;
determining a set of modified tuning parameters associated with the measured modified seat position; and
applying the set of modified tuning parameters to an audio system.

22. The program as claimed in claim 21 wherein the received sensed and measured modified seat position is received from a sensing system capable of sensing and measuring any difference in seat tilt angle, vertical seat distance and horizontal seat distance from the default seat position.

23. The program as claimed in claim 22 wherein the received sensed and measured modified seat position is received from a sensing system having a seat position sensor.

24. The program as claimed in claim 22 wherein the received sensed and measured modified seat position is received from a sensing system having a camera with depth sensing capability.

25. The program as claimed in claim 22 wherein the received sensed and measured modified seat position is received from a sensing system having a light-based distance sensor.

26. The program as claimed in claim 25 wherein the light-based distance sensor is a LIDAR based sensing system.

27. The program as claimed in claim 22 wherein the received sensed and measured modified seat position is received from a sensing system having a sound-based distance sensor.

28. The program as claimed in claim 27 wherein the sound-based distance sensor is a SONAR based sensing system.

29. The program as claimed in claim 21 wherein the set of modified tuning parameters is determined by interpolating a set of tuning parameters between a set of minimum values for tuning parameters and a set of maximum values for tuning parameters.

30. The program as claimed in claim 29 wherein the set of modified tuning parameters is determined by interpolating between the sets of minimum and maximum values for tuning parameters and the set of default tuning parameters.

31. The program as claimed in claim 21 wherein the seat has a finite number of seat positions and the set of modified tuning parameters is determined by mapping an absolute seat position to a database storing a plurality of predetermined sets of tuning parameters, wherein each predetermined set of tuning parameters in the plurality of predetermined sets of tuning parameters is associated with one of the finite number of seat positions.

* * * * *